(12) United States Patent
Lu et al.

(10) Patent No.: US 10,914,038 B2
(45) Date of Patent: Feb. 9, 2021

(54) PAPER STRENGTH IMPROVING POLYMER COMPOSITION AND ADDITIVE SYSTEM, USE THEREOF, AND MANUFACTURE OF PAPER PRODUCTS

(71) Applicant: Kemira Oyj, Helsinki (FI)

(72) Inventors: Chen Lu, Marietta, GA (US); Jenna Rabideau, Rydal, GA (US)

(73) Assignee: KEMIRA OYJ, Helsinki (FI)

( * ) Notice: Subject to any disclaimer, the term of this patent is extended or adjusted under 35 U.S.C. 154(b) by 31 days.

(21) Appl. No.: 16/314,560

(22) PCT Filed: May 14, 2018

(86) PCT No.: PCT/EP2018/062398
§ 371 (c)(1),
(2) Date: Dec. 31, 2018

(87) PCT Pub. No.: WO2019/057350
PCT Pub. Date: Mar. 28, 2019

(65) Prior Publication Data
US 2019/0249370 A1    Aug. 15, 2019

Related U.S. Application Data

(60) Provisional application No. 62/560,341, filed on Sep. 19, 2017.

(51) Int. Cl.
| | | |
|---|---|---|
| *D21H 21/20* | (2006.01) | |
| *C08L 33/26* | (2006.01) | |
| *C08L 1/28* | (2006.01) | |
| *D21H 17/42* | (2006.01) | |
| *D21H 17/26* | (2006.01) | |
| *D21H 17/00* | (2006.01) | |
| *D21H 17/55* | (2006.01) | |
| *D21H 27/00* | (2006.01) | |
| *D21H 27/10* | (2006.01) | |
| *D21H 17/24* | (2006.01) | |
| *D21H 21/18* | (2006.01) | |
| *D21H 17/37* | (2006.01) | |

(52) U.S. Cl.
CPC ............ *D21H 21/20* (2013.01); *C08L 1/284* (2013.01); *C08L 33/26* (2013.01); *D21H 17/24* (2013.01); *D21H 17/26* (2013.01); *D21H 17/37* (2013.01); *D21H 17/375* (2013.01); *D21H 17/42* (2013.01); *D21H 17/55* (2013.01); *D21H 17/72* (2013.01); *D21H 21/18* (2013.01); *D21H 27/002* (2013.01); *D21H 27/10* (2013.01)

(58) Field of Classification Search
None
See application file for complete search history.

(56) References Cited

U.S. PATENT DOCUMENTS

| | | | |
|---|---|---|---|
| 3,049,469 A | | 8/1962 | Davison |
| 5,061,346 A | * | 10/1991 | Taggart ................. D21H 17/00 162/175 |
| 5,723,021 A | * | 3/1998 | Nguyen ................. D21C 5/022 162/168.1 |
| 6,294,645 B1 | * | 9/2001 | Allen .................... C08G 73/028 523/414 |
| 6,359,040 B1 | * | 3/2002 | Burdick ................. D21H 21/14 524/43 |
| 6,939,433 B2 | | 9/2005 | Ikuhara et al. |
| 2003/0234089 A1 | | 12/2003 | Ryan et al. |

FOREIGN PATENT DOCUMENTS

| | | |
|---|---|---|
| EP | 1918455 A1 | 5/2008 |
| WO | 9958609 A1 | 11/1999 |
| WO | 2012042115 A1 | 4/2012 |
| WO | 2016034776 A1 | 3/2016 |
| WO | 2017114478 A1 | 7/2017 |

OTHER PUBLICATIONS

International Search Report issued by the European Patent Office acting as the International Searching Authority in relation to International Application No. PCT/EP2018/062398 dated Jul. 30, 2018 (5 pages).

Clayton Campbell, Chen Lu, Junhua Chen, Adrian Stuart, Towel/Facial Wet End Optimisation: Utilizing Strength Additives and Functional Promoters, Tissue World, Aug./Sep. 2012 (4 pages).

* cited by examiner

*Primary Examiner* — Dennis R Cordray
(74) *Attorney, Agent, or Firm* — Robert P. Michal, Esq.; Carter, DeLuca & Farrell LLP

(57) ABSTRACT

A polymer composition including an anionic synthetic polymer, an anionic polysaccharide, including a strength additive system, a paper product and a method of production.

25 Claims, No Drawings

PAPER STRENGTH IMPROVING POLYMER COMPOSITION AND ADDITIVE SYSTEM, USE THEREOF, AND MANUFACTURE OF PAPER PRODUCTS

CROSS-REFERENCE TO RELATED APPLICATIONS

This application is a national phase entry under 35 U.S.C. 371 of PCT International Application No. PCT/EP2018/062398 filed May 14, 2018, which claims priority to U.S. Provisional Application No. 62/560,341, filed Sep. 19, 2017, the disclosure of each of these applications is expressly incorporated herein by reference in their entirety.

FIELD OF THE INVENTION

The present invention relates to a polymer composition, strength additive system, their use and production of a paper product.

BACKGROUND

In the manufacturing of paper grades which come into contact with moist or water during processing or use, for example towel, facial, and certain packaging paper grades, wet strength additives are widely added to the pulp suspension to provide wet strength to the paper product. This is because an untreated cellulose fiber web will typically lose 95-97% of its strength when saturated with water. The term "wet strength" refers to the strength of finished paper or paperboard after it has been rewetted by water. Wet strength may be of temporary or permanent nature. A paper product which when placed in an aqueous medium retains a substantial portion of its initial wet strength over time is regarded to have good permanent wet strength. On the other hand, a paper product for which wet strength is sufficient for the intended use, but which then decays over time upon soaking in water, is regarded to have good temporary wet strength.

A common permanent wet strength additive is polyamidoamine epichlorohydrin (PAE), which contains cationic azetidinium functional groups. Two mechanisms have been proposed to explain wet strength enhancement by PAE. One is through the interaction between azetidinium groups and the anionic sites on fibers and fines (primarily carboxyl groups), and the other one is through PAE self-crosslinking. Wet strength PAE resins are often applied in rather high dosages which can cause many production operation issues.

Most bleached virgin pulps have low conductivity and low cationic demand. However, commercial wet strength PAE resins have a high cationic charge density, typically between 2 and 3 meq/g. Consequently, the high dosages of PAE resins required for providing the desired wet strength often convert the net charge of pulp suspension from anionic to cationic, resulting in poor PAE retention and low PAE efficiency. In addition, the un-retained PAE resin accumulates in the water system, leading to poor drainage, wire and felt plugging, sheet defects and breaks, and increased foaming requiring higher defoamer usage. Excessive un-retained PAE resin may cause deposits at later stages of the paper production, e.g. on the Yankee surface and harden crepe coating, resulting in poor creping performance. Furthermore, plugged felts produce high moisture streaks, which in turn strip crepe coating.

See e.g. the publication by Clay Campbell, Chen Lu, Junhua Chen, Adrian Stuart, Towel/Facial Wet End Optimization: Utilizing Strength Additives and Functional Promoters, Tissue World, August/September, 2012.

Carboxymethyl cellulose (CMC) has been used in the past together with wet strength PAE resins but this combination has limitations. CMC provides wet and dry tensile strength improvement. In addition, CMC normally carries relatively high anionic charge density and can effectively convert pulp suspensions to have negative charge. However, commercial CMC products are delivered in dry form and costly make-down units are needed before any application. In many cases, the make-down process is incomplete or inconsistent, leading to partially hydrated CMC, poor strength development, and plugged filters. Additionally, CMC is prone to microbiological growth.

U.S. Pat. Nos. 3,049,469 and 6,939,443 disclose that synthetic copolymers of acrylamide and acrylic acid obtained by solution polymerization are used as an alternative to CMC if an easy-to-handle solution product is required by the paper producer. Solution polymerization products are provided in liquid form and mix easily with dilution water. There is no need for either an expensive make-down unit or an extra post-dilution aging tank. However, synthetic polymers do not provide comparable strength development as CMC at similar cost. Furthermore, synthetic products have a narrow operating window and only provides optimal strength performance at narrow weight ratios of synthetic anionic polymer/PAE. If the ratio is too high or too low, the strength properties will decrease significantly.

There is a need to minimize the problems raised above and improve the overall production of papers. Consequently, more cost-effective and easy-to-handle strength additives and systems are still highly desired by many paper producers.

There is a need for new ways of making paper to provide maintained or improved paper attributes such as strength, while improving the operation of the paper machine. It is also desirable to provide more environmentally friendly ways for production of paper.

SUMMARY OF THE INVENTION

According to one aspect of the present invention, there is provided a new anionic polymer composition comprising an anionic synthetic polymer and an anionic polysaccharide. The present anionic polymer composition show good strength performance in paper making processes.

The present anionic polymer composition provides also a solution-based anionic promoter for a cationic additive, preferably a cationic reactive strength additive. The present polymer composition can be delivered in a liquid form, e.g. as a solution or dispersion, with relatively high solids content and low bulk viscosity. This anionic polymer composition delivered significantly higher wet and dry tensile strength to a paper product than a conventional synthetic anionic solution polymerization product. The polymer composition also showed a strength performance comparable with or better than CMC. As the aqueous polymer composition has lower viscosity with higher solids content, e.g. compared to an aqueous solution of CMC, it is easier to handle, and solutions can be made and stored at higher solids content requiring less storage tank space. Also, application of the aqueous polymer composition is easier, both when applied to aqueous pulp furnish but especially when applied on web, as there it is desired to keep the amount of added water as low as possible.

Furthermore, the new anionic polymer composition has a broad operating window and the improved paper strength properties can be achieved over a wide weight range of the cationic additives, especially cationic reactive strength additives, to the anionic polymer composition. Commercial papermaking processes fluctuate regularly over time and paper machine operators need to adjust dosages of chemical additives frequently to produce in-spec paper products. As a result, broad operating window is an important property for a papermaking additive so that operators can reach optimal chemical dosages quickly during normal paper machine fluctuations without producing off-spec products.

The new anionic polymer composition facilitates improved fixation of the cationic additive, especially cationic reactive strength additive, to the fibers, and allows increasing its dosage. Although the new anionic polymer composition is aimed for improving paper strength properties, it may also be used for maintaining desired strength properties e.g. while reducing the paper product grammage or increasing filler amount, that are known to decrease paper strength.

DETAILED DESCRIPTION

The present invention relates to an anionic polymer composition comprising a mixture of an anionic synthetic polymer and an anionic polysaccharide. Preferably the anionic polymer composition is in form of an aqueous solution. In one embodiment the anionic polymer composition may consist only of the mixture of the anionic synthetic polymer and the anionic polysaccharide.

As used herein for the anionic polymer composition, anionic synthetic polymer and anionic polysaccharide, by anionic is meant a net anionic charge, i.e. cationic units or groups may be present in the composition, polymer and/or polysaccharide, but only to the extent that the overall charge of the polymer composition, synthetic polymer and polysaccharide remains net anionic (at pH 8). Similarly, as used herein for the cationic additive(s), by cationic is meant a net cationic charge, i.e. anionic units or groups may be present, but only to the extent that the overall charge of the cationic additive(s) remains net cationic (at pH 7).

The anionic polymer composition may be provided in the form of a dry powder or a liquid, such as an aqueous polymer composition. Preferably a stable aqueous polymer composition is obtainable that comprises said two anionic components. Preferably a homogenous mixture is provided of the polymer composition. Without wishing to be bound by any theory it is believed that the stability of the obtained aqueous polymer composition is due to e.g. intertwining of the polymer chains. Other features that may influence the stability of the obtained polymer composition may be a high physical entanglement and interlacing of the polymer chains, and further stabilization by hydrogen bonds and van der Waals forces. Compared to e.g. aqueous compositions of grafted polymers, said grafted compositions are more viscous than an aqueous mixture at same solids content, so a mixture is easier to handle and perform well for strength properties, especially initial wet strength and dry strength. Additionally, the present polymer composition is microbiologically more stable than e.g. CMC alone, so performance losses due to microbiological deterioration are minimized.

The aqueous polymer composition of the present invention may have a solids content of about 1-50 wt %, such as 5-50 wt %, 5-30 wt %, or 10-30 wt %, based on the total weight of the polymer composition. Compositions having solids contents within these ranges are easy to pump and dilute without special and costly equipment. Furthermore, polymer compositions having solids contents within these ranges can be delivered to the customers at a reasonable shipping cost.

The anionic polymer composition of the present invention may also be provided in the form of a dry powder having solids content of at least 80 wt %, such as at least 90 wt %, or at least 95 wt %. In other words, the polymer composition in the form of a dry powder may have a moisture content of at most 20 wt %, such as at most 15 wt % or at most 10 wt %. Compositions in the form of dry powders are advantageous due to cost-efficient transportation, and long shelf-life. Even though make-down and dilution units may be needed at the site of use to obtain an additive solution that can be added to the papermaking process, it is believed that both make-down and dilution of the anionic polymer composition in the form of dry powder are easier than make-down and dilution of dry CMC alone, as lower solution viscosity at same solids content may be achieved, or same viscosity at higher solids content.

The present anionic polymer composition comprising the anionic synthetic polymer and anionic polysaccharide is preferably present in the form of an aqueous solution. As used herein, an aqueous anionic polymer composition is meant to cover also an aqueous dispersion, including e.g. solutions that may contain minor amounts of incompletely dissolved or partially dissolved material, or undissolved or incompletely dissolved residues. Thus, the wording aqueous polymer composition is herein to be interpreted as either a solution or dispersion thereof. An aqueous solution of the anionic polymer composition is preferable when used in a papermaking process. As used herein, an aqueous solution of an anionic synthetic polymer and anionic polysaccharide is meant to cover also an aqueous dispersion thereof.

The anionic polymer composition may be prepared well before use in a papermaking process, or it may be prepared on-site at the paper mill, where an aqueous solution of the anionic synthetic polymer and an aqueous solution of the anionic polysaccharide may be mixed just before addition to the papermaking process. If the anionic synthetic polymer and the anionic polysaccharide are supplied to the paper mill in dry form, they may be mixed together, the dry mixture being made-down and diluted in desired solids content with water before addition to the papermaking process. Alternatively, dry anionic polysaccharide may be dissolved into an aqueous solution of the anionic synthetic polymer, or dry anionic synthetic polymer may be dissolved into an aqueous solution of the anionic polysaccharide.

Anionic synthetic polymers may be selected from the group of polymers polymerised from vinyl monomers providing anionic units, and may be selected from the group of polymers polymerised from vinyl monomers providing nonionic units, and/or cationic units. If cationic units are present the net charge is still to be anionic.

Anionic synthetic polymers may be selected from the group of polymers polymerised from vinyl monomers providing anionic units. The anionic synthetic polymer may comprise anionic units originating from vinyl monomers. Vinyl monomers providing anionic units to the anionic synthetic polymer may be selected from the group consisting of monomers containing e.g. a carboxylic acid functional group, a sulfonic acid functional group, a phosphonic acid functional group, their corresponding water soluble or dispersible salts, and any combinations thereof.

As used herein, by vinyl monomers are meant monomers containing at least one carbon-carbon double bond, whether as part of vinyl, allyl, acryloyl, or any other structure.

Specific examples of vinyl monomers providing anionic units to the anionic synthetic polymer may be selected from the group consisting of acrylic acid, methacrylic acid, maleic acid, itaconic acid, vinyl sulfonic acid, 2-acrylamido-2-methylpropane sulfonic acid (AMPS), acrylamido methane sulfonic acid, acrylamido ethane sulfonic acid, 2-hydroxy-3-acrylamide propane sulfonic acid, styrene sulfonic acid, and vinyl phosphonic acid, their corresponding water soluble or dispersible alkali metal, alkaline earth metal, and ammonium salts, and any combinations thereof. The vinyl monomers may be selected from the group acrylic acid, its water soluble or dispersible alkali metal, alkaline earth metal, and ammonium salts, and any combinations thereof.

The anionic synthetic polymer may comprise nonionic units originating from vinyl monomers. Vinyl monomers that may provide nonionic units to the anionic synthetic polymer may be selected from the group consisting of acrylamide-based monomers such as (meth)acrylamide, dialkylaminoalkyl (meth)acrylamides, for example dialkylaminopropyl (meth)acrylamides, hydrophobically derivatized acrylamide-based monomers such as N-tert-butylacrylamide (TBAm), N-octadecylacrylamide (ODAm), N-diphenylmethylacrylamide (DPMAm), or N-isopropylacrylamide (NIPAM); acrylate-based monomers such as alkyl (meth)acrylates, alkoxyalkyl (meth)acrylates, dialkylaminoalkyl (meth)acrylates, for example dimethylaminoethyl (meth)acrylate; N-vinylcarbamides such as N-vinylformamide; styrene; acrylonitrile; vinyl acetate; N-vinylpyrrolidone; N-vinyl-2-caprolactam; maleic anhydride; vinylethers such as 2-hydroxybutylvinylether; and any combinations thereof. Especially, vinyl monomers providing nonionic units to the anionic synthetic polymer may be selected from acrylamide-based monomers.

The anionic synthetic polymer of the polymer composition may comprise low amounts of cationic units, provided that the net charge of said synthetic polymer remains anionic. Such anionic synthetic polymers may be obtained by polymerizing a mixture of monomers comprising anionic monomers, cationic or zwitterionic monomers, and optionally nonionic monomers, present in amounts that provide net anionicity to the obtained polymer (at pH 8).

Vinyl monomers providing cationic units may be selected from the group consisting of dimethylaminoethyl methacrylate (DMAEM), dimethylaminoethyl acrylate (DMAEA), diethylaminoethyl acrylate (DEAEA), diethylaminoethyl methacrylate (DEAEM), and their quaternary ammonium forms made with dimethyl sulfate or methyl chloride, Mannich reaction modified polyacrylamides, diallylcyclohexylamine hydrochloride (DACHA HCl), diallyldimethylammonium chloride (DADMAC), methacrylamidopropyltrimethylammonium chloride (MAPTAC), vinylpyridine, vinylimidazole, allyl amine (ALA), and any combinations thereof.

The anionic synthetic polymer of the polymer composition may be a homopolymer of at least one anionic monomer, obtainable for example by polymerizing anionic monomers, preferably one or more of the above listed vinyl monomers providing anionic units to the anionic synthetic polymer, or polymerizing (meth)acrylamide monomers to obtain poly(meth)acrylamide followed by a complete acid or alkali hydrolysis of the poly(meth)acrylamide.

The anionic synthetic polymer may be a copolymer of acrylamide and acrylic acid, its water soluble or dispersible alkali metal, alkaline earth metal, or ammonium salts, and any combinations thereof.

The anionic synthetic polymer of the polymer composition may be an anionic polyacrylamide (APAM), preferably a copolymer of at least one anionic monomer and (meth)acrylamide, or partially hydrolysed poly(meth)acrylamide. More preferably the anionic synthetic polymer is poly (acrylic acid-co-acrylamide).

The anionic synthetic polymer may be essentially consisting of anionic polyacrylamide.

The anionic synthetic polymer may be prepared by solution polymerization, gel polymerization, emulsion polymerization or dispersion polymerization. The anionic synthetic polymer may be in the form of a solution, dry powder, emulsion or dispersion.

The weight average molecular weight of the anionic synthetic polymer may be in the range of about 5 000 Da to about 10 MDa, preferably about 50 000 Da to about 5 MDa, more preferably about 50 000 Da to about 1 MDa. It is believed that anionic synthetic polymers having molecular weight in these ranges provide greater strength improvement, while still avoiding over-flocculation when added to the aqueous pulp furnish.

The choice of a particular anionic synthetic polymer will be dependent upon furnish, filler, water quality, paper grade, and the like.

Preferably the anionic synthetic polymer is hydrophilic and water-soluble.

Other components, such as chain transfer agents, chelating agents, surfactants, and inorganic salts, may also be present and used when preparing the anionic synthetic polymer, as well known by a skilled person.

The anionic synthetic polymer may be present in the anionic polymer composition in an amount of about 5-95 wt %, such as about 10-80 wt %, or about 20-70 wt %, based on the solids content of the polymer composition. Aqueous polymer compositions having the anionic synthetic polymer content within these ranges are easy to pump and dilute without special and costly equipment, and anionic polymer compositions in the form of dry powder are easy to makedown and dilute, providing solutions with reasonable solids contents and handleable viscosities. Additionally, polymer compositions having the anionic synthetic polymer content within these ranges have a broad operating window and the improved paper strength properties can be achieved over a wide weight range of the cationic additive, especially the cationic reactive strength additive, to the anionic polymer composition. Furthermore, polymer compositions having the synthetic polymer content within these ranges can be delivered to the customers at a reasonable shipping cost.

The above benefits may also be obtainable by anionic polymer compositions having a weight ratio (dry/dry) of said anionic synthetic polymer (e.g. APAM) to said anionic polysaccharide (e.g. CMC) in the range of 1:20-20:1, preferably 1:10-10:1, such as 1:10-5:1, 1:10-2:1, 1:10-1:5, 1:10-1:2, or 1:5-1:1. These weight ratios may provide efficient viscosity control of the anionic polymer composition in form of an aqueous solution. Weight ratios providing more anionic synthetic polymer to the composition may be more effective in providing aqueous compositions with lower viscosities. Weight ratios providing more anionic polysaccharide to the composition may be more effective in providing strength improvement.

As used herein, by an anionic polysaccharide is meant a polysaccharide of single type or a combination of different polysaccharides. The anionic polysaccharide may be selected from the group consisting of anionic cellulose-based polysaccharides, anionic alginate-based polysaccharides, anionic guar-based polysaccharides, anionic starch-based polysaccharides, and any combinations thereof. The anionic polysaccharide may be selected from the group consisting of anionic cellulose-based polysaccharides, anionic starch-based polysaccharides, and any combinations thereof.

The anionic polysaccharide may be present in the polymer composition in an amount of at most 95 wt %, such as at most 80 wt %, or at most 70 wt %, based on the solids content of the polymer composition. The anionic polysaccharide may be present in the polymer composition in an amount of about 1-95 wt %, such as about 10-80 wt %, about 10-80 wt %, about 20-70 wt % or about 30-60 wt %, based on the solids content of the polymer composition. For example, aqueous polymer compositions having the polysaccharide content within these ranges are easy to pump and dilute without special and costly equipment. Furthermore, the polymer compositions having the anionic polysaccharide content within these ranges can be delivered to the customers at a reasonable shipping cost.

The weight average molecular weight of the anionic polysaccharide (e.g. CMC) may be in the range of about 50 000 Da to about 1 000 000 Da.

Pulp cellulose can bind strongly with cellulose-based polysaccharides through hydrogen bonding and van der Waals forces due to their structural similarities. This strong interaction favors paper strength development. Thus, anionic cellulose-based polysaccharides are more beneficial than many others.

The anionic cellulose-based polysaccharides may be selected from the group consisting of oxidized celluloses, phosphorylated celluloses, anionic cellulose ethers, and any combinations thereof. Suitably the anionic cellulose-based polysaccharide comprises one or more anionic cellulose ethers, especially one or more carboxymethylated celluloses.

Anionic cellulose ethers may be selected from the group consisting of carboxymethylcellulose (CMC); carboxymethylhydroxyethylcellulose (CMHEC); carboxymethyl methyl cellulose (CMMC); and any combinations thereof. A particularly preferred example of anionic cellulose ethers is carboxymethylcellulose (CMC).

Examples of anionic guar-based polysaccharides may be selected from the group consisting of carboxymethylhydroxypropyl guar (CMHPG), carboxymethyl guar (CMG), and any combinations thereof.

Examples of anionic starch-based polysaccharides may be selected from the group consisting of oxidized starch, phosphorylated starch, carboxymethylated starch, and any combinations thereof.

The anionic polysaccharide may contain hydroxyl and/or carboxyl groups. These groups are capable of interacting with cationic reactive strength additives, such as PAE azetidinium groups, thereby further enhancing a crosslinking degree of the reactive strength additive, resulting in higher paper wet and dry strength properties.

The anionic polysaccharide may be anionic cellulose-based polysaccharide consisting essentially of CMC. This embodiment has the advantage of high compatibility with cellulosic fibers due to structural similarities, and desired interaction with the cationic reactive strength additives, such as PAE azetidinium groups, due to the presence of both hydroxyl and carboxyl groups.

The anionic polysaccharide may have a Brookfield viscosity of at least 1.5 mPas, as measured from an aqueous polysaccharide solution having solids content 0.1 wt %, using a Brookfield LVT viscometer at 22° C., spindle 00, 60 rpm. The Brookfield viscosity of the aqueous solution of the anionic polysaccharide is proportional to the molecular weight of the polysaccharide. A polysaccharide having Brookfield viscosity in the defined ranges possesses beneficial molecular weight for fixation of the composition into final paper products. Polymer fixation is a direct function of polymer molecular weight and higher molecular weight leads to greater fixation efficiency. If the polysaccharide has too low viscosity, indicating a very low molecular weight, there may be insufficient polymer fixation and consequently poor strength performance, especially when the anionic polymer composition is added to the aqueous pulp furnish. Typically the anionic polysaccharide, especially CMC, may have weight average molecular weight in the range of 50 000-1 000 000 Da.

The anionic polymer composition may further comprise materials such as enzymes, silica microparticles, and/or bentonite, or any combination thereof. Such compounds may further improve strength, retention and drainage properties.

The polymer composition may be an aqueous polymer composition having a Brookfield viscosity of at most 50 000 mPas, such as at most 40 000 mPas or at most 10 000 mPas. Ranges of the viscosity may be e.g. about 1-50 000 mPas, about 2-40 000 mPas, or 5-10 000 mPas, as measured using a Brookfield LVT viscometer at 22° C. Because the viscosity range is so wide the spindle and speed needs to be selected suitably, which a skilled person knowing the machinery would be able to. For example spindle #4, 60 rpm, are good when measuring viscosity of the polymer composition in the range of 1000-10000 mPas. For measuring polymer compositions having higher viscosities, up to 50 000 mPas, same spindle but lower speed may be used. The Brookfield viscosity of the aqueous polymer composition is proportional to the solids content of said composition. The aqueous polymer composition has lower solution viscosity than aqueous solution of the constituent anionic polysaccharide alone at same solids content.

In general, the anionic polymer composition has an anionic net charge, as measured by Mütek charge titration at pH 8. Preferably the anionic polymer composition has an anionic charge density of about 1.0-7.0 meq/g (dry), more preferably 1.0-5.0 meq/g (dry), at pH 8. This may also be disclosed as a charge density of about −1.0 to −7.0 meq/g (dry) or −1.0 to −5.0 meq/g (dry). Anionic polymer compositions having charge density in this range may have improved interactions with cationic charges present in the papermaking process, such as with the cationic additives, thereby further improving their fixation to the fibres, and strength properties of the paper.

The anionic polysaccharide may have an anionic charge density of about 1-10 meq/g, such as 1-7.5 meq/g, 1-7 meq/g, preferably 1-5 meq/g, such as 1.5-5 meq/g, as measured by Mütek charge titration at pH 8. This may also be disclosed as a charge density of about −1 to −10 meq/g, such as −1 to −7.5 meq/g, −1 to −7 meq/g, −1 to −5 meq/g, or −1.5 to −5 meq/g.

The anionic synthetic polymer may have an anionic charge density of 0.1-10 meq/g, such as 0.1-7 meq/g, 0.1-5 meq/g, 1-7 meq/g, or 1-5 meq/g, as measured by Mütek charge titration at pH 8. This may also be disclosed as a charge density of about −0.1 to −10 meq/g, such as −0.1 to −7 meq/g, −0.1 to −5 meq/g, or −1 to −7 meq/g, or −1 to −5 meq/g.

Preferably CMC having the above mentioned Brookfield viscosity and/or anionic charge density is used as the anionic polysaccharide. When used together with the cationic reactive strength additive this additionally provides optimal strength performance and operating window in terms of weight ratio of the cationic reactive strength additive to the anionic polymer composition.

It is to be noted that the present polymer composition provides an improved paper strength when used in paper making. Further, the present polymer composition may act to promote a cationic additive, such as cationic reactive strength additive, also provided to the papermaking process, to further improve and boost the performance of the cationic additive. Thus, additional improvements such as improved drainage, and/or further increase in paper strength may be provided.

It is known that anionic strength additives such as CMC or low molecular weight anionic polyacrylamide often lead to a decrease in the drainage rate. This may increase the drying demand of the fibre web, requiring e.g. an increase in steam consumption in the dryer section. As steam availability may be limited in the paper production facility, drying demand of the fibre web is often a rate limiting step with respect to productivity rates.

When the anionic polymer composition is used in combination with cationic additive, it may be possible to alleviate or overcome the known drainage decreasing effect of anionic strength additives, sometimes even drainage improvements may be possible.

Herein is also provided a strength additive system comprising the present anionic polymer composition, i.e. the mixture of the anionic synthetic polymer and anionic polysaccharide. The strength additive system comprises also at least one cationic additive. The present system is a kit of parts, which may be provided to a papermaking process. The present strength additive system may thus be used in the manufacturing of a paper product.

The polymer composition of the strength additive system may have any of the properties already disclosed for the polymer composition.

The at least one cationic additive may be selected from alum, polyaluminium chloride, polyvinylamine (PVAM), polyethylene imine (PEI), homopolymer or copolymer of diallyldimethylammonium chloride (DADMAC), polyamine, cationic polyacrylamide-based solution polymer, cationic starch, and cationic reactive strength additives, such as polyamidoamine-epichlorohydrin resins, glyoxalated polyacrylamide resins, urea formaldehyde resins, melamine formaldehyde resins, and any combinations thereof.

At least one of the cationic additives used is preferably reactive.

The strength additive system may comprise the present polymer composition and a cationic additive, such as cationic reactive strength additive. The strength additive system may comprise the present polymer composition and a cationic additive, that is not a cationic reactive strength additive, preferably selected from alum, polyaluminium chloride, polyvinylamine (PVAM), polyethylene imine (PEI), homopolymer or copolymer of diallyldimethylammonium chloride (DADMAC), polyamine, cationic polyacrylamide-based solution polymer, cationic starch, and any combinations thereof. The strength additive system may comprise the present polymer composition, a cationic reactive strength additive, and a cationic additive, that is not a cationic reactive strength additive, selected from alum, polyaluminium chloride, polyvinylamine (PVAM), polyethylene imine (PEI), homopolymer or copolymer of diallyldimethylammonium chloride (DADMAC), polyamine, cationic polyacrylamide-based solution polymer, cationic starch, and any combinations thereof. I.e. the cationic additive may be selected from at least one as cationic reactive strength additive and/or at least cationic additive that is not a cationic reactive strength additive.

The cationic additive may be a water soluble cationic additive, e.g. the cationic reactive strength additive may be a water soluble cationic reactive strength additive.

The at least one cationic additive may be selected from cationic reactive strength additives. The cationic reactive strength additives may be selected from the group polyamidoamine-epichlorohydrin resins, glyoxalated polyacrylamide resins, urea formaldehyde resins, and melamine formaldehyde resins, and any combinations thereof. Preferably, the cationic reactive strength additive comprises or is polyamidoamine-epichlorohydrin.

The cationic reactive strength additive of the strength additive system may have a cationic charge density in the range from 0.1-10 meq/g, preferably 0.3-5 meq/g, as measured at pH 7.

The charge ratio of the total cationic charge and the total anionic charge of the at least one cationic additive and the anionic polymer composition in the strength additive system may be in the range of 60:1-1:60, such as 30:1-1:30, or 15:1-1:15.

The weight ratio (dry/dry) of the cationic additive, especially the cationic reactive strength additive, and the polymer composition of the strength additive system may be in the range of 1:100-100:1, such as 1:50-50:1, or 1:20-20:1.

Herein is also provided a method of manufacturing the present polymer composition comprising the steps of:
(a) providing an anionic synthetic polymer;
(b) providing an anionic polysaccharide;
(c) mixing said anionic synthetic polymer and said anionic polysaccharide to a mixture. The mixture may be a dry or liquid mixture. Preferably, a homogenous mixture is provided, and if liquid, may also be referred to as homogenous aqueous solution.

Herein is also provided a method of manufacturing a strength additive system comprising the steps of:
(i) providing the present polymer composition;
(ii) providing a cationic reactive strength additive; and
(iii) optionally mixing the polymer composition with the cationic reactive strength additive,
to provide said strength additive system, which may be used for manufacturing paper products.

If the anionic synthetic polymer and the anionic polysaccharide are supplied in dry form, they may, respectively, be mixed with water to provide aqueous solutions, e.g. just before addition to the papermaking process. Alternatively, if the anionic synthetic polymer and the anionic polysaccharide are supplied in dry form, they may be mixed together and then supplied with water to provide an aqueous solution, e.g. just before addition to the papermaking process.

In papermaking pulp is processed to a finished paper product.

"Pulp" refers typically to a fibrous cellulosic material. The pulp may also refer to cellulosic fibers, non-cellulosic polymeric fibers, or any combinations thereof. Suitable cellulosic fibers for the production of the pulps are all conventional grades, for example mechanical pulp, bleached and unbleached chemical pulp, recycled pulp, and paper stocks obtained from all annuals. Mechanical pulp includes, for example, groundwood, thermomechanical pulp (TMP), chemo thermochemical pulp (CTMP), alkaline peroxide mechanical pulp (APMP), groundwood pulp produced by pressurized grinding, semi-chemical pulp, high-yield chemical pulp and refiner mechanical pulp (RMP). Examples of suitable chemical pulps are sulfate, sulfite, and soda pulps. The unbleached chemical pulps, which are also referred to as unbleached kraft pulp, can be particularly used. In addition to cellulosic fibers, or instead of them, the pulp may comprise non-cellulosic polymeric fibers, such as fibers of polyethylene, polypropylene, or polyester, in the form of e.g. single component or bicomponent fibers.

"Pulp furnish" refers to a mixture of pulp and water. The pulp furnish may also be referred to as pulp slurry herein. The pulp furnish is prepared in practice using water, which can be partially or completely recycled from the paper machine. It can be either treated or untreated white water or a mixture of such water qualities. The pulp furnish may contain interfering substances, such as fillers. The filler content of paper may be up to about 40% by weight. Suitable fillers are, for example, clay, kaolin, natural and precipitated chalk, titanium dioxide, talc, calcium sulfate, barium sulfate, alumina, satin white or mixtures of the stated fillers.

As used herein, the terms "paper" or "paper product" is understood to include a sheet material that contains paper fibers, which may also contain other materials, and it is herein meant to encompass all types of fibre webs whether paper, paperboard, board, tissue, towel, etc. Suitable paper fibers include natural and synthetic fibers, for example, cellulosic fibers, wood fibers of all varieties used in papermaking, other plant fibers, such as cotton fibers, fibers derived from recycled paper; and the synthetic fibers, such as rayon, nylon, fiberglass, or polyolefin fibers. Paperboard is a paper that is thicker, heavier, and less flexible than conventional paper.

As used herein, the terms "paper web" and "web" are understood to include both forming and formed paper sheet materials, papers, and paper materials containing paper fibers. The paper product may be a coated, laminated, or composite paper material. The paper product can be bleached or unbleached.

Herein is also provided a method of making a paper product, e.g. having improved strength, preferably improved wet and/or dry strength. The method comprises the steps of providing an aqueous pulp furnish, draining the aqueous pulp furnish to form a wet fiber web, and drying the wet fiber web to obtain the paper product. The method further comprises addition of:

at least one cationic additive, and an anionic synthetic polymer and an anionic polysaccharide, preferably as the present anionic polymer composition i.e. these are supplied in the form of the present anionic polymer composition, to the aqueous pulp furnish or on the wet web; or the present strength additive system to the aqueous pulp furnish or on the wet web. In the present method the addition of the anionic synthetic polymer and the anionic polysaccharide may thus either be done as separate components, but preferably in the form of the present anionic polymer composition.

The present method of making a paper product covers also manufacture of multilayered paper products. In some embodiments the method of making the paper may further comprise step of combining separately formed wet fibre webs, and/or laminating separately formed dried fibre webs.

As the present strength additive system comprises said anionic polymer composition and said cationic additive, it may also be used in the present manufacturing method.

The aqueous pulp furnish may comprise recycled and/or virgin fibers.

An enhanced strength of the paper product may allow for reduction in additive dosage, decrease of grammage on the paper product being produced, and/or increase of filler content and maintaining a desired strength of the paper. In such a way the economy of the paper manufacturing may be influenced.

In the present manufacturing method, the anionic synthetic polymer and the anionic polysaccharide may be supplied to the aqueous pulp furnish or on the wet web as separate components, or provided as a mixture in accordance with the present anionic polymer composition.

The anionic polymer composition may be prepared well before use in a paper making process, or it may be prepared at the papermaking process, where the anionic synthetic polymer and the anionic polysaccharide are mixed before addition to the papermaking process. The anionic polymer composition is preferably water containing but with addition of additional water may be made before addition to the papermaking process.

In the process of making paper a cationic additive, preferably a cationic reactive strength additive, may be added to the aqueous pulp furnish prior to addition of the present polymer composition.

In the process of making paper the cationic additive, such as the cationic reactive strength additive, may be added to the aqueous pulp furnish simultaneously or subsequent to addition of the present polymer composition. Alternatively, in the process of making paper, the cationic additive, such as the cationic reactive strength additive may be added to the aqueous pulp furnish simultaneously or subsequent to addition of the anionic synthetic polymer and the anionic polysaccharide, when such are added to the process separately and not as a mixture according to the present composition. Said cationic additives or cationic reactive strength additives may selected from the same options as disclosed previously, e.g. polyamidoamine-epichlorohydrin.

The present polymer composition alone, as well as together with the cationic additive, such as the cationic reactive strength additive, and any other additives, may be added to the papermaking process at any point in the process where such cationic additives, e.g. cationic reactive strength resins, are usually added. The polymer composition and the cationic additive, such as the cationic reactive strength additive, which also may be referred to as present strength additive system, may be added at any time before, during and/or after the paper is formed. For example, the polymer composition composition and the cationic additive, such as the cationic reactive strength additive, may be added before, or after the refining of the pulp, at the fan pump, or at the head box, or by spraying or by other means applying the materials on the wet web. Typically, the polymer composition is added at the fan pump or machine chest in the form of an aqueous solution.

The polymer composition may be added on the wet web by spraying, printing, coating, padding, foam application, roller fluid feeding and/or impregnating. Advantageously, when applied on the wet web, the addition of the polymer composition is made by spraying.

The polymer composition may be added before or simultaneously with a cationic reactive strength additive in the papermaking process. The cationic additive, such as the cationic reactive strength additive, may be added to the same step as the polymer composition or a subsequent step of the paper making process.

The polymer composition and the cationic additive, i.e. the components of the strength additive system, may be premixed and the mixture may then be added to the aqueous pulp furnish or applied onto the wet fiber web.

Alternatively, the polymer composition and the cationic additive, i.e. the components of the strength additive system, may be added separately to the aqueous pulp furnish and/or applied onto the wet fiber web. For example, one of the components of the strength additive system may be added to the aqueous pulp furnish and the other component onto wet fiber web. In an exemplary embodiment, the strength additive system including the anionic polymer composition, and the cationic additive, such as the cationic reactive strength additive, the different components may be combined first and then applied to a web or fibers at a stage of the papermaking process. In another embodiment the components, i.e. the anionic polymer composition, and the cationic additive, such as the cationic reactive strength additive, may be applied sequentially in the order polymer composition first, then the cationic additive, such as the cationic reactive strength additive second, at the same stage of the papermaking process. In another embodiment the components, may be applied separately but simultaneously, at the same stage of the papermaking process. After the components have been applied to the web, the web or fibers are dried and heated to remove web moisture content below 20% in order to achieve the desired interaction between the additives (anionic polymer composition and the cationic additive, such as the cationic reactive strength additive).

The cationic reactive strength additive is normally supplied in liquid form, thus if a strength additive system is to comprise a mixture of anionic synthetic polymer, the anionic polysaccharide and cationic reactive strength additive, this may be prepared in liquid form as an aqueous solution.

Herein is also provided method of making paper to enhance the strength of the paper produced comprising adding the present strength additive system to the aqueous pulp furnish at the wet end of the papermaking machine and forming paper from the aqueous furnish. Alternatively, the present strength additive system may be added to the wet fiber web of the papermaking process.

For example, in the present process, the anionic synthetic polymer and the anionic polysaccharide may separately, or the anionic polymer composition containing these materials as a mixture, may be added before, and/or simultaneously as the cationic additive, such as the cationic reactive strength additive. The anionic synthetic polymer and the anionic polysaccharide, as separate components, or as the anionic polymer composition, and the cationic additive, such as the cationic reactive strength additive, may be added separately to the aqueous pulp furnish or onto the wet fiber web. The cationic additive, such as the cationic reactive strength additive, may be added subsequent to the anionic synthetic polymer and the anionic polysaccharide, as separate components, or as the anionic polymer composition.

A paper product comprising the present polymer composition or present additive system may be provided. Such a paper product may be selected from towels, tissues, and boards, including packaging materials, e.g. facial tissues, hand towels, packaging boards, liner, fluting, folding boxboard (FBB), white lined chipboard (WLC), solid bleached sulphate (SBS) board, solid unbleached sulphate (SUS) board or liquid packaging board (LPB) etc.

As is indicated above the present polymer composition may be used for providing improving strength properties to paper products. The present polymer composition may be used with cationic additives or the present strength additive system may be used for improving fixation of cationic additives, especially the cationic reactive strength additives to fibers, thereby providing improvement to the effect of the cationic additive, such as to drainage, or further increase in strength properties of paper products.

EXAMPLES

Materials

Solution polymerized anionic polyacrylamide samples APAM 1-4 were prepared by copolymerizing acrylamide and acrylic acid, with an anionic charge density of 3.4 meq/g (dry) (APAM 1); 0.7 meq/g (dry) (APAM 2); 1.5 meq/g (dry) (APAM 3); 4.3 meq/g (dry) (APAM 4), at pH 8.

The anionic polysaccharide was CMC, being a commercial product with an anionic charge density of 2.9 meq/g (dry). The solution viscosities of both products were summarized in Table 1.

Brookfield viscosities were determined by providing the desired weight-% with deionized water and measuring the viscosity using a Brookfield LVT DV-II viscometer with a LVT #4 spindle at 0.3-60 rpm at pH 7, 22° C. Spindle rpm range was varied to obtain the optimal torque range specified by Brookfield.

A commercial cationic reactive strength additive was used, being a commercial wet strength PAE resin, which had a cationic charge density around 2.0 meq/g (dry) at pH 7.

TABLE 1

Solution viscosities of CMC and APAM at room temp (22° C.).

| Description | Composition | Low rpm viscosity (mPas) | Medium rpm viscosity (mPas) | High rpm viscosity (mPas) |
| --- | --- | --- | --- | --- |
| CMC 1 | 6.4 wt % CMC in water | 13 500 (at 12 rpm) | 10 000 (at 30 rpm) | 7 800 rpm (at 60 rpm) |
| CMC 2 | 8.5 wt % CMC in water | 138 000 (at 1.5 rpm) | 100 000 (at 3 rpm) | 75 000 (at 6 rpm) |
| CMC 3 | 10.0 wt % CMC in water | 748 000 (at 0.3 rpm) | 491 000 (at 0.6 rpm) | 290 000 (at 1.5 rpm) |
| Anionic polyacrylamide 1 (APAM 1) | 20 wt % APAM in water | 7 700 (at 12 rpm) | 7 800 (at 30 rpm) | 7 800 (at 60 rpm) |
| Anionic polyacrylamide 2 (APAM 2) | 20 wt % APAM in water | 4700 (at 12 rpm) | 4900 (at 30 rpm) | 4900 (at 60 rpm) |
| Anionic polyacrylamide 3 (APAM 3) | 20 wt % APAM in water | 8770 (at 12 rpm) | 8850 (at 30 rpm) | 8850 (at 60 rpm) |
| Anionic polyacrylamide 4 (APAM 4) | 20 wt % APAM in water | 7500 (at 12 rpm) | 7520 (at 30 rpm) | 7520 (at 60 rpm) |

Polymer Composition by Mixing of APAM and CMC

CMC solutions were first prepared by dissolving dry CMC in de-ionized water. Then, APAM solution was introduced into CMC solution. Then, the mixture was agitated with an over-head mixer to ensure a homogenous solution. Provided were 15 mixtures, whereof 5 mixtures were further tested in papermaking.

Brookfield viscosities were determined using a Brookfield LVT DV-II viscometer with a LVT #4 spindle at 12-60 rpm at pH 7, 22° C. Spindle rpm range was varied to obtain the optimal torque range specified by Brookfield.

Table 2 continues. Properties of the anionic polymer compositions

| MIXTURE | Composition (weight of the polymer solution) | Viscosity (mPas) at 12 rpm | Viscosity (mPas) at 30 rpm | Viscosity (mPas) at 60 rpm | Solids content of the polymer composition (wt %) | Amount of APAM (wt % based on the solids content of the polymer composition) | APAM to CMC weight ratio (dry/dry) | Composition charge density (meq/g (dry)) |
|---|---|---|---|---|---|---|---|---|
| 1 | 54 g CMC 1 + 46 g APAM 1 | 1500 | 1600 | 1600 | 12.7 | 73 | 1:0.4 | −3.2 |
| 2 | 59 g CMC 2 + 41 g APAM 1 | 3500 | 3200 | 3000 | 13.2 | 62 | 1:0.6 | −3.1 |
| 3 | 67 g CMC 3 + 33 g APAM 1 | 6400 | 5700 | 5200 | 13.3 | 50 | 1:1 | −3.1 |
| 4 | 75 g CMC 3 + 25 g APAM 1 | 10800 | 9100 | 8000 | 12.5 | 40 | 1:1.5 | −3.0 |
| 5 | 32 g CMC 2 + 68 g APAM 1 | 3060 | 2940 | 2820 | 16.3 | 83 | 1:0.2 | −3.2 |
| 6 | 92 g CMC 2 + 8 g APAM 1 | 28600 | NA | NA | 9.4 | 17 | 1:5 | −2.9 |
| 7 | 48 g CMC 2 + 52 g APAM 2 | 11900 | 9920 | 8450 | 14.4 | 71 | 1:0.4 | −1.3 |
| 8 | 59 g CMC 2 + 41 g APAM 2 | 18200 | 13400 | 10000 | 13.3 | 63 | 1:0.6 | −1.5 |
| 9 | 70 g CMC 2 + 30 g APAM 2 | 17000 | 12700 | NA | 11.9 | 50 | 1:1 | −1.7 |
| 10 | 48 g CMC 2 + 52 g APAM 3 | 11900 | 9950 | 8580 | 14.4 | 71 | 1:0.4 | −1.9 |
| 11 | 59 g CMC 2 + 41 g APAM 3 | 20400 | 16200 | NA | 13.3 | 63 | 1:0.6 | −2.0 |
| 12 | 70 g CMC 2 + 30 g APAM 3 | 21500 | 15400 | NA | 11.9 | 50 | 1:1 | −2.2 |
| 13 | 48 g CMC 2 + 52 g APAM 4 | 2610 | 2320 | 2120 | 14.4 | 71 | 1:0.4 | −3.9 |
| 14 | 59 g CMC 2 + 41 g APAM 4 | 3160 | 2640 | 2300 | 13.3 | 63 | 1:0.6 | −3.7 |
| 15 | 70 g CMC 2 + 30 g APAM 4 | 2700 | 2390 | 2150 | 11.9 | 50 | 1:1 | −3.6 |

Preparation of Handsheets (Tissue)
Lab Pulp Suspension Preparation

Handsheets were prepared using a pulp mixture (2.5 wt %) of virgin bleached hardwood and virgin bleached softwood. The Canadian Standard Freeness of the mixture was 450 ml. Pulp dilutions during handsheet preparation were carried out using a specially formulated water to simulate papermaking mill white water. This formulated water contained 150 ppm of sodium sulfate, 35 ppm of calcium chloride, and 200 ppm alkalinity (adjusted by sodium bicarbonate). The final pH was adjusted to 7.8 using dilute hydrochloric acid and sodium hydroxide.

Handsheet Preparation

First, the pulp suspension was first diluted to 0.4 wt %. Then, 25 lb/ton of PAE was added to the pulp suspension under agitation followed by anionic polymer composition at various dosages. After two minutes of extra mixing, four 3-g sheets of paper were formed using a standard (8"×8") Nobel & Woods handsheet mold, to target a basis weight of 52 lbs/3470 ft2. The handsheets were pressed between felts in the nip of a pneumatic roll press at about 15 psig and dried on a rotary dryer at 110° C. Then, the handsheets were further cured in a convection oven at 110° C. for additional 5 minutes. Finally, those handsheets were conditioned in the standard TAPPI control room for overnight before testing.

Preparation of Handsheets (Board)
Lab Pulp Suspension Preparation

Post-refining old corrugated container (OCC) pulp was obtained from the machine chest of a paperboard manufacturing mill. The OCC pulp was free from any wet end chemical treatments and had a consistency of around 3.5%. To simulate paper machine headbox water chemistry, the OCC pulp was first diluted to 0.8% consistency with tap water. Then, NaCl was added to the diluted pulp suspension to increase its conductivity to 4.1 mS/cm. Last, dilute H2SO4/NaOH solutions were used to adjust the pulp suspension pH to about 6.5.

Handsheet Preparation

First, chemical solutions were added to the diluted pulp suspension under overhead agitation. Chemical addition sequence is as following: cationic polymer, anionic promoter, anionic flocculant (if required). Then, the treated pulp suspensions were added to the dynamic sheet former (DSF) (TECHPAP France, type—FDA) to produce 110 gsm sheets. DSF was set to produce sheets with a MD/CD ratio around 2.7. Next, formed sheets were pressed with blotting paper at 20 psi using a pneumatic roll press and then dried on a rotary dryer at 110° C. Last, dry paper sheets are oven (forced air conventional oven) cured at 105° C. for 5 minutes and conditioned in the standard TAPPI control room for overnight.

Strength Measurements
Initial Wet Tensile Strength Test

Initial wet tensile strength test method is used to determine the wet tensile strength of paper or paperboard that has been in contact with water for 2 seconds. A 1-inch wide paper test specimen sample was placed in the tensile testing machine and wetted on both sides with deionized water by a paint brush. After the contact time of 2 seconds, the specimen was elongated as set forth in 6.8-6.10 TAPPI test method 494 (2001). The initial wet tensile is useful in the evaluation of the performance characteristics of tissue product, paper towels and other papers subjected to stress during processing or use while instantly wet. This method references U.S. Pat. No. 4,233,411, and was modified as described above.

STFI and Burst Strength Test

Short Span Compressive Strength (STFI):

STFI test was carried out using a L&W compressive strength tester and used to determine the compressive resistance for paper board application. A test specimen was first cut along paper cross direction and then placed in two clamps that were forced towards each other until a compressive failure occurs. The maximum force causing failure was measured, and reported in the unit of lb force/in or kN/m. The higher the value, the higher the compressive strength of the board. This test follows TAPPI Test Method 826 pm-92: short span compressive strength of container board.

Burst:

Bursting strength is widely used as a measure of resistance to rupture in paper. In this study, bursting strength was measured as the hydrostatic pressure in pounds per square inch (psi) or kilo Pascals (kPa) required to produce rupture of the material when the pressure is increased at a controlled constant rate through a rubber diaphragm (TAPPI Test Method 403). Measurements were taken using a TMI Burst Tester Model 13-60-00-0001, and the average value was reported. A higher burst measurement indicates a stronger paper.

TABLE 3

Handsheet (tissue) initial wet tensile strength (lb/in)

|  | 0 lb/ton | 4 lb/ton | 8 lb/ton |
| --- | --- | --- | --- |
| APAM 1 | 6.4 | 8.4 | 7.1 |
| CMC | 6.4 | 8.9 | 9.4 |
| Mixture 1 | 6.4 | 8.6 | 9.6 |
| Mixture 2 | 6.4 | 9.0 | 10.2 |
| Mixture 3 | 6.4 | 9.2 | 9.4 |
| Mixture 4 | 6.4 | 9.2 | 9.9 |

TABLE 4

Handsheet (board) STFI and burst strength

| Anionic polymer (10 lb/ton) | STFI (lb/in) | STFI increase | Burst (psi) | Burst increase |
| --- | --- | --- | --- | --- |
| None (control) | 7.8 | NA | 37.0 | NA |
| Mixture 3 | 9.5 | 21% | 44.6 | 21% |
| Mixture 6 | 9.2 | 17% | 45.5 | 23% |
| APAM 1 | 9.0 | 15% | 42.4 | 15% |
| CMC | 9.0 | 15% | 44.5 | 20% |

Results and Discussion

Medium to high molecular weight CMC products are mostly used by paper towel producers to enhance the PAE performance. Once dissolved in water, those CMC products lead to high solution viscosity at low solid content.

As shown in Table 1, a 10% CMC solution produced a solution viscosity of more than 200 000 mPas, which is considerably higher than the level that can be handled easily by typical industrial pumping equipment. In addition, CMC solutions are pseudoplastic and their viscosities increases with decreasing shear rate. For above reasons, CMC products are commonly shipped in dry form and are dissolved onsite at low conctrations.

Table 2 demonstrates that mixing CMC solution with an APAM solution can lower the CMC solution viscosity significantly. The APAM solution used was a Newtonian fluid with a solid content of 20% and a solution viscosity of 7800 mPas. This APAM solution was mixed with CMC solutions with a concentration of 6.4%, 8.5%, or 10.0%. 6.4% CMC (CMC 1) solution has a viscosity around 7800 mPas too at 60 rpm. Mixing CMC 1 and APAM 1 solutions at 54:46 weight ratio (based on the solution weight) produced a homogeneous stable solution with a final viscosity of only 1600 mPas at 60 rpm. Similarly, mixing 8.5% CMC solution or 10.0% CMC solution with APAM 1 resulted in stable products with a final viscosity lower than 10 000 mPas, with which the solution can be transferred using conventional pumping equipment in a timely fashion.

Table 3 shows the effect of various anionic polymer compositions on paper initial wet tensile. In this study, the pulp suspension was first treated with 25 lb/ton PAE wet strength resin. Then, 4 or 8 lb/ton of anionic polymer composition was added to the pulp to enhance PAE performance. At 4 lb/ton, CMC increased wet tensile strength from 6.4 to 8.9 lb/in, while 4 lb/ton APAM and mixture 1 gave lower wet tensile strength values of 8.4 and 8.6 lb/in respectively. In contrast, 4 lb/ton mixtures 2 to 4 all generated higher wet tensile strength than that by CMC. At 8 lb/ton, CMC further increased wet tensile strength to 9.4 lb/ton. However, 8 lb/ton APAM decreased wet tensile strength to only 7.1 lb/in. In contrast, all mixtures provided comparable or higher wet tensile strength. 8 lb/ton of mixture 2 resulted in the highest wet tensile strength of 10.2 lb/in.

Table 4 shows the effect of various anionic polymer compositions on paper short span compressive strength (STFI) and burst strength. In this study, 5 lb/ton of polyamine and 0.3 lb/ton of HMW anionic flocculant were used for fixing 10 lb/ton of anionic polymer composition to the pulp fibres. From the results it can be seen that, both APAM 1 and CMC increased paper STFI by 15%. In comparison, mixtures 3 and 6 provided higher STFI increases of 21% and 17% respectively. Furthermore, both mixtures generated higher burst strength increases. APAM 1 and CMC increased burst strength by 15% and 20% respectively. In comparison, mixtures 3 and 6 increased burst strength by 21% and 23% respectively. In summary, mixtures of APAM 1 and CMC demonstrated syntergistic benefits on paper strength enhancement.

The invention claimed is:

1. An anionic polymer composition comprising an anionic synthetic polymer and an anionic polysaccharide selected from anionic cellulose-based polysaccharides, anionic starch-based polysaccharides, or any combination thereof, wherein the anionic synthetic polymer comprises
   i) anionic units originating from vinyl monomers selected from acrylic acid, methacrylic acid, maleic acid, itaconic acid, vinyl sulfonic acid, 2-acrylamido-2-methylpropane sulfonic acid (AMPS), acrylamido methane sulfonic acid, acrylamido ethane sulfonic acid, 2-hydroxy-3-acrylamide propane sulfonic acid, styrene sulfonic acid, vinyl phosphonic acid, their corresponding water soluble or dispersible alkali metal, alkaline earth metal, or ammonium salts, or any combinations thereof,
   ii) nonionic units originating from vinyl monomers selected from acrylamide-based monomers, acrylate-based monomers, N-vinylcarbamides, styrene, acrylonitrile, vinyl acetate, N-vinylpyrrolidone, N-vinyl-2-caprolactam, maleic anhydride, vinylethers, or any combinations thereof, or
iii) a copolymer of acrylamide and acrylic acid, its water soluble or dispersible alkali metal, alkaline earth metal, ammonium salts, or any combinations thereof,
wherein the anionic polymer composition has an anionic charge density of about 1.0-5.0 meq/g (dry), and the anionic synthetic polymer has an anionic charge density of 0.1-5 meq/g, as measured by Mütek charge titration at pH 8,
wherein the anionic synthetic polymer is present in an amount of about 5-95 wt %, based on the solids content of the polymer composition, and
wherein the anionic polysaccharide is present in an amount of about 1-95 wt %, based on the solids content of the polymer composition.

2. The anionic polymer composition according to claim 1, wherein a weight ratio (dry/dry) of said anionic synthetic polymer to said anionic polysaccharide is 1:20-20:1.

3. The anionic polymer composition according to claim 1, wherein the anionic polymer composition is an aqueous polymer composition having a solids content of about 1-50 wt %, based on the total weight of the anionic polymer composition.

4. The anionic polymer composition according to claim 3, wherein the anionic aqueous polymer composition has a Brookfield viscosity of at most 50 000 mPas, as measured using a Brookfield LVT viscometer at 22° C.

5. A method of making a paper product comprising:
providing an aqueous pulp furnish, draining the aqueous pulp furnish to form a wet fiber web, and drying the wet fiber web to obtain the paper product, and
further comprising addition of at least one cationic additive and the anionic polymer composition according to claim 3 to the aqueous pulp furnish or on the wet web.

6. The method according to claim 5, wherein the aqueous pulp furnish comprises recycled fibers and/or virgin fibers.

7. A paper product formed by the method according to claim 5 and comprising the at least one cationic additive and the anionic polymer composition, wherein the paper product is selected from the group consisting of towels, tissues, and packaging materials.

8. The anionic polymer composition according to claim 1, wherein the anionic polymer composition is a dry powder having a moisture content of at most 20 wt %.

9. The anionic polymer composition according to claim 1, wherein the vinyl monomers providing anionic units to the anionic synthetic polymer are
acrylic acid, its water soluble or dispersible alkali metal, alkaline earth metal, or ammonium salts, or any combination thereof.

10. The anionic polymer composition according to claim 1, wherein the anionic synthetic polymer comprises non-ionic units originating from vinyl monomers being acrylamide-based monomers.

11. The anionic polymer composition according to claim 1, wherein the anionic cellulose-based polysaccharides are selected from the group consisting of oxidized celluloses, anionic cellulose ethers, and any combinations thereof.

12. The anionic polymer composition according to claim 1, wherein said anionic polysaccharide is an anionic cellulose-based polysaccharide consisting essentially of carboxymethylcellulose (CMC).

13. The anionic polymer composition according to claim 1, further comprising any one of enzymes, silica microparticles, and bentonite, or any combination thereof.

14. A strength additive system for use in manufacturing of paper products comprising the anionic polymer composition according to claim 1; and at least one cationic additive.

15. The strength additive system according to claim 14, wherein the at least one cationic additive is alum, polyaluminium chloride, polyvinylamine (PVAM), polyethylene imine (PEI), homopolymer or copolymer of diallyldimethylammonium chloride (DADMAC), polyamine, cationic polyacrylamide-based solution polymer, cationic starch, or any combination thereof.

16. The strength additive system according to claim 14, wherein the cationic additive is polyamidoamine-epichlorohydrin.

17. The strength additive system according to claim 14, wherein a weight ratio (dry/dry) of the cationic additive(s) and the anionic polymer composition is from 1:100-100:1.

18. The strength additive system according to claim 14, wherein the charge ratio of the total cationic charge and the total anionic charge of the at least one cationic additive and the anionic polymer composition is 60:1-1:60.

19. A method of making a paper product comprising:
providing an aqueous pulp furnish, draining the aqueous pulp furnish to form a wet fiber web, and drying the wet fiber web to obtain the paper product, and
further comprising addition of the strength additive system of claim 14 to the aqueous pulp furnish or on the wet web.

20. The method of claim 19, wherein the strength additive system improves fixation of cationic additives to fibers, and provides improved strength properties to the paper products.

21. A paper product comprising a strength additive system according to claim 14, wherein the paper product is selected from the group consisting of towels, tissues, and packaging materials.

22. The strength additive system according to claim 14, wherein the at least one cationic additive includes cationic reactive strength additives.

23. The strength additive system according to claim 14, wherein the at least one cationic additive includes cationic reactive strength additives selected from polyamidoamine-epichlorohydrin resins, glyoxalated polyacrylamide resins, urea formaldehyde resins, melamine formaldehyde resins, or any combinations thereof.

24. A paper product comprising an anionic polymer composition according to claim 1, wherein the paper product is selected from the group consisting of towels, tissues, and packaging materials.

25. A method of using the anionic polymer composition of claim 1, to provide improved strength properties to paper products, comprising the step of adding the anionic polymer composition to an aqueous pulp furnish or to a wet web in a papermaking process.

* * * * *